United States Patent
Jeanvoine et al.

(10) Patent No.: US 8,621,889 B2
(45) Date of Patent: *Jan. 7, 2014

(54) PROCESS FOR PREPARING BATCH MATERIALS FOR THE MANUFACTURE OF GLASS

(75) Inventors: Pierre Jeanvoine, Poissy (FR); Arnaud Le Verge, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 488 days.

This patent is subject to a terminal disclaimer.

(21) Appl. No.: 12/240,068

(22) Filed: Sep. 29, 2008

(65) Prior Publication Data

US 2009/0042709 A1 Feb. 12, 2009

Related U.S. Application Data

(62) Division of application No. 10/490,215, filed as application No. PCT/FR02/03398 on Oct. 4, 2002, now Pat. No. 7,448,231.

(30) Foreign Application Priority Data

Oct. 8, 2001 (FR) .................................. 01 13021

(51) Int. Cl.
C03B 5/16 (2006.01)
(52) U.S. Cl.
USPC .......... 65/134.5; 423/331; 423/332; 423/334; 501/27
(58) Field of Classification Search
USPC ............. 65/134.5; 423/331, 332, 334; 501/27
See application file for complete search history.

(56) References Cited

U.S. PATENT DOCUMENTS

| | | | |
|---|---|---|---|
| 4,269,817 A | 5/1981 | Rohrmann | |
| 4,491,454 A * | 1/1985 | Lompa-Krzymien | .......... 44/623 |
| 5,344,633 A | 9/1994 | Sörensson et al. | |
| 5,753,102 A * | 5/1998 | Funakoshi et al. | ........ 208/208 R |
| 5,785,940 A | 7/1998 | Carroll et al. | |
| 5,807,476 A * | 9/1998 | Collins et al. | ................. 208/236 |
| 5,922,097 A | 7/1999 | Kobayashi et al. | |
| 6,460,376 B1 | 10/2002 | Jeanvoine et al. | |
| 6,739,152 B2 | 5/2004 | Jeanvoine et al. | |
| 6,883,349 B1 | 4/2005 | Jeanvoine | |
| 7,097,818 B2 | 8/2006 | Lindner et al. | |
| 2004/0168475 A1 | 9/2004 | Jeanvoine | |
| 2006/0000239 A1 | 1/2006 | Jeanvoine et al. | |
| 2007/0122332 A1* | 5/2007 | Jacques et al. | ................. 423/331 |

FOREIGN PATENT DOCUMENTS

| | | |
|---|---|---|
| EP | 0 812 809 | 12/1997 |
| FR | 1 211 098 | 3/1960 |
| JP | 35-2264 | 3/1960 |
| WO | WO 00/46161 | 8/2000 |

* cited by examiner

Primary Examiner — Joseph S Del Sole
Assistant Examiner — Russell Kemmerle, III
(74) Attorney, Agent, or Firm — Oblon, Spivak, McClelland, Maier & Neustadt, L.L.P.

(57) ABSTRACT

The invention relates to a process for manufacturing compounds based on one or more silicates of alkali metals and/or of alkaline-earth metals, optionally in the form of mixed silicates that combine at least two of these elements, said process involving:
(i) preferably a conversion reaction (1) in which halides of said alkali metals and/or of said rare earths and/or of said alkaline-earth metals are converted into the corresponding sulfates;
(iii) a conversion reaction (2) in which said sulfates together with silica are converted into the corresponding silicates, the heat supply needed for this conversion being provided, at least in part, by a combustion reaction (3) using a submerged burner or a plurality of submerged burners.

34 Claims, 1 Drawing Sheet

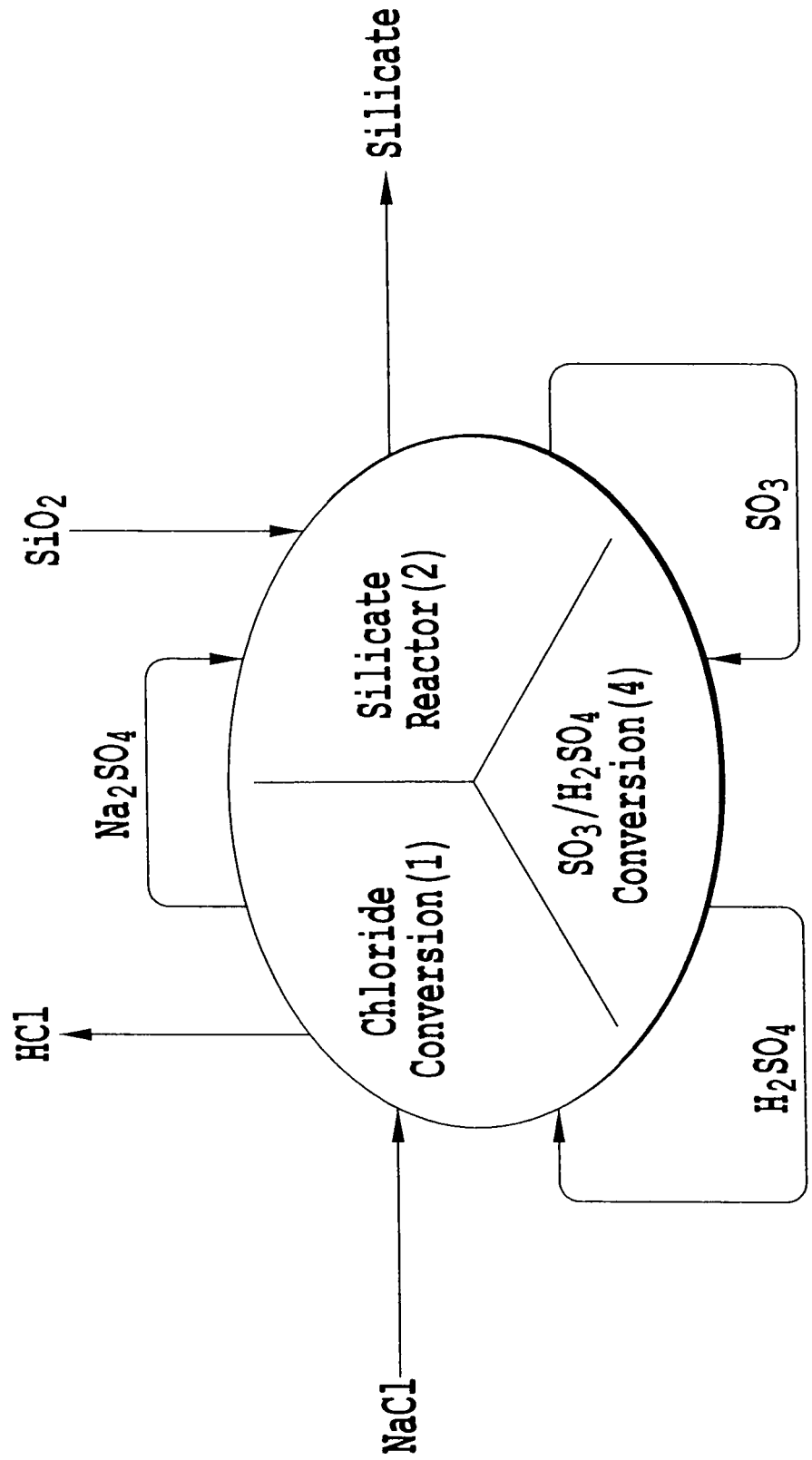

PROCESS FOR PREPARING BATCH MATERIALS FOR THE MANUFACTURE OF GLASS

The invention relates to a process for preparing some of the materials that may be used to manufacture glass.

Within the context of the present invention, the term "batch materials" is understood to mean all materials, vitrifiable substances, natural ores or synthesized products, materials resulting from cullet-type recycling, etc. that can be incorporated into the composition feeding a glass furnace. Likewise, the term is "glass" is understood to mean glass in the broad sense, that is to say encompassing any material with a glass, glass-ceramic or ceramic matrix. The term "manufacture" includes the indispensable step of melting the batch materials and possibly all the subsequent/supplementary steps for the purpose of refining/conditioning the molten glass for the purpose of its final forming operation, especially in the form of flat glass (glazing), hollow-ware (flasks, bottles), glass in the form of mineral (glass or rock) wool used for its thermal or acoustic insulation properties, or even possibly glass in the form of yarns referred to as textile yarns used in reinforcement.

The invention relates most particularly to the batch materials needed to manufacture glasses having a significant content of alkali metals, especially sodium, for example glasses of the silica-soda-lime type used to make flat glass. The batch material currently used most often for providing sodium or potassium is sodium carbonate $Na_2CO_3$ or potassium carbonate $K_2CO_3$, which choice is not without its drawbacks since, on the one hand, this compound provides only sodium as constituent element of the glass, the entire carbonate part decomposing in the form of evolution of $CO_2$ during melting. On the other hand, this is an expensive batch material, compared with the others, since it is a synthetic product obtained by the Solvay process from sodium chloride and lime, which process involves a number of manufacturing steps and is quite expensive in terms of energy.

This is the reason why it has been proposed to use as sodium source not a carbonate but a silicate, possibly in the form of a mixed alkali metal (Na)/alkaline-earth metal (Ca) silicate prepared beforehand. The use of this type of intermediate product has the advantage of jointly providing several of the constituents of the glass, of eliminating the decarbonatization phase and of reducing $CO_2$ emissions from the melting furnace. It also makes it possible to speed up the melting of the batch materials in their entirety and of favoring their homogenization during melting as indicated, for example, in the patents FR-1 211 098 and FR-1 469 109. However, this approach poses the problem of the manufacture of this silicate.

A first method of synthesis was described in the patent WO-00/46161: this involves the conversion of a halide, for example NaCl, and silica into a silicate at high temperature, the heat supply being provided by submerged burners. Combustion by submerged burners is already known, for example from the patents U.S. Pat. No. 3,627,504, U.S. Pat. No. 3,260, 587 or U.S. Pat. No. 4,539,034, for melting vitrifiable materials to make glass. To use this technology in a context different from the synthesis of silicates, and therefore upstream of the actual glass manufacture, indeed offers many advantages: this method of combustion causes, within the materials undergoing reaction, strong turbulence and vigorous convection motion around the gas jets or flames from the submerged burners. This promotes very effective stirring of the reactants. Furthermore, submerged burners provide the heat directly at the point where it is needed, into the mass of the products undergoing reaction. It is also an environmentally friendly method of combustion.

For further details about the various reactions involved, reference may be made to the aforementioned patent WO-00/46161.

Direct conversion of NaCl and silica carried out in this way is therefore very attractive for more than one reason. However, this direct conversion has proved to be ill suited to implementation on a large scale.

The object of the invention is therefore to develop another type of silicate manufacture, which can retain the advantages of the technique described above, while being easier to use on an industrial scale. Secondarily, it will be attempted to make this novel type of manufacture as environmentally friendly as possible and to take into account/utilize, to the best, all the reaction products involved other than the silicates, the manufacture of the silicates remaining the primary objective of the present invention.

The subject of the invention is firstly a process for manufacturing compounds based on one or more silicates of alkali metals, such as Na, K and/or of alkaline-earth metals, such as Ca, Mg, and/or of rare earths, such as Ce, optionally in the form of mixed silicates that combine at least two of these elements. This process involves:

(i) a conversion reaction (1) in which halides, especially chlorides, of said alkali metals and/or of said alkaline-earth metals and/or of said rare earths are converted into the corresponding sulfates;

(ii) a conversion reaction (2) in which said sulfates together with silica are converted into the corresponding silicates, the heat supply needed for this conversion being provided, at least in part, by a combustion reaction (3) using a submerged burner or a plurality of submerged burners.

The process according to the invention may also comprise only step (ii) according to reaction (2).

The term "silica" is understood here to mean any compound containing predominantly silica (silicon oxide) $SiO_2$, even if it may also contain other elements and other minority compounds, this being most particularly the case when natural materials of the sand type are used.

The term "submerged burners" is understood here to mean burners configured so that the "flames" that they generate or the combustion gases emanating from these flames develop in the reactor where the conversion takes place, within the very mass of the materials being converted. Generally speaking, the burners are placed so as to be flush with or slightly proud of the sidewalls or of the floor of the reactor used (the term "flames" is used here, even though they are not strictly speaking the same "flames" as those produced by crown burners, for the sake of simplicity).

The process described above is an improvement to the process described in the patent WO-00/46161, in the sense that it splits into two separate steps the overall reaction involving a halide (such as NaCl) and silica to make a silicate. In the present invention, there is thus an intermediate step consisting in manufacturing a sulfate. The industrial feasibility is greatly improved thereby: it thus avoids having to thermally "break down" an NaCl-type halide at very high temperature, which would cause the NaCl to undergo a certain amount of volatilization in the furnace where the reaction with the silica takes place. In contrast, in the invention, step (1) of converting the halide into a sulfate is easier to carry out and can take place at a relatively lower temperature and under operating conditions already well controlled in the chemical industry. Step (2) of converting the sulfate into a silicate by submerged burners makes it possible to obtain the desired product with all the advantages of submerged burners mentioned in the preamble of the present application.

To illustrate these two steps, for the purpose of manufacturing sodium silicate, the invention therefore proposes in particular the following successive steps:
(i) $2\ NaCl+H_2SO_4 \rightarrow Na_2SO_4+2\ HCl$
(ii) $Na_2SO_4+xSiO_2 \rightarrow (SiO_2)x-Na_2O+SO_2/SO_3$ For this second reaction, the value of x may vary—one example is especially x=2.

The present text will later return to the beneficiation/utilization of the reactants/reaction products involved in these reactions, other than NaCl, $SiO_2$ and the silicate $(SiO_2)x-Na_2O$.

The effectiveness of the burners in all aspects (quality of the mixing, excellent heat transfer) means that the conversion according to reaction (2) is greatly favored, and is so without there being a need to attain extremely high temperatures.

Another advantage of submerged burners is the following: they allow the introduction of liquid/solid fuels in the same way as the vitrifiable batch materials. This consequently results in the obtaining of high redox levels of the molten silicate, this being favorable to the sulfate decomposition reaction.

The chosen oxidizer for feeding the submerged burner(s) in reaction (2) may simply be air. However, it is preferential to use an oxidizer in the form of oxygen-enriched air, and even an oxidizer substantially in the form of oxygen alone. A high oxygen concentration is advantageous for various reasons: the volume of the combustion smoke is thus reduced, this being favorable from the energy standpoint and avoids any risk of excessive fluidization of the materials undergoing the reaction, that may cause splashing against the superstructures or the roof of the reactor where the conversion takes place. Furthermore, the "flames" obtained are shorter and more emissive, thereby allowing their energy to be transferred more rapidly to the materials undergoing melting/conversion.

As regards the choice of fuel for the submerged burner(s), three approaches are possible, as alternatives or in combination: it is possible to choose a liquid fuel, a gaseous fuel or a fuel in solid form.

If it is at least partly in gaseous form, it may feed the submerged burners directly. If it is in liquid or solid form, it may be brought close to the submerged burners.

As gaseous fuel, mention may be made of natural gas (predominantly methane), propane, hydrogen or any other hydrocarbon-based compound and/or sulfur-based.

As solid or liquid fuel, mention may be made of any compound predominantly in carbon-based and/or hydrocarbon-based and/or sulfur-based form (including sulfur and carbon): as in the previous case, these may be byproducts of the oil industry (heavy fuel oil, asphalt). They may be polymer-based materials that can thus be recycled (any plastics, tires, etc.), and even hydrocarbon-contaminated sand, which will also provide both the silica and the fuel, which is an ingenious way of handling the problem of decontaminating beaches after an oil spillage for example.

In fact, one particularly novel feature of the present invention is that it is possible to use, if so desired, sulfur-containing fuels, or even pure sulfur. There are traces of sulfur in all vulcanized polymers (tires) and sulfur is also found in byproducts of the oil industry, and the invention allows them to be beneficially utilized: this is because the sulfur contained in the fuel provided for carrying out combustion reaction 3 will be oxidized. Now, as is known in the chemical/oil industry, these sulfur oxides ($SO_2$ and/or $SO_3$) may be converted to sulfuric acid, by recovering them from the smoke and treating them appropriately. There are therefore two choices (alternative or cumulative in fact, especially depending on the quantity of $H_2SO_4$ manufactured, which depends intimately on the chosen S content of the fuel), namely either the $H_2SO_4$ is utilized, as a reactant widely used in the chemical industry, independently of the process according to the invention, or it is reused in the process of the invention. This is because reaction (1) of converting the halides into sulfates advantageously uses sulfuric acid: this is therefore a "feedback" process in which the combustion product of reaction (2), once converted, is used as reactant in reaction (1).

There is another way, as an alternative to or in combination with the previous one, of manufacturing $H_2SO_4$ from the process according to the invention: reaction (2) of converting sulfate to silicate itself produces sulfur oxides $SO_2$ and/or $SO_3$. Here again, these sulfur oxides may therefore be recovered and made to undergo a conversion reaction, converting them to sulfuric acid. As in the previous case, this sulfuric acid may be reused as reactant in reaction (1) and/or it may be utilized as a reactant for the chemical industry.

As a result, if the fuel contains a significant amount of sulfur, these two reactions of converting sulfur oxides to sulfuric acid may produce more, and even significantly more, sulfuric acid than is needed for reaction (1) of converting the halides to sulfates, resulting in the beneficiation of the process according to the invention in its entirety.

There is another reaction product in the process of the invention that can be utilized, especially in the chemical industry, this being hydrochloric acid HCl, manufactured during reaction (1) of converting the halides to sulfates, when the halide in question is a chloride of the NaCl type.

Of course, it may be treated as an effluent, that can be neutralized with calcium carbonate $CaCO_3$, which amounts to manufacturing $CaCl_2$, that can be used for example for freeing roads from snow. HCl may also be considered as a base chemical widely used in the chemical industry (just like $H_2SO_4$) and the HCl can be extracted from the smoke in order to set up an industrial HCl production line. It is therefore beneficial to install the plant for carrying out this reaction (1) on the chemical industry site that requires this type of chlorinated product.

A first outlet for the silicates manufactured according to the invention is in the glass industry: they may substitute, at least in part, for the conventional batch materials that provide alkali metals or rare earths, with, particularly as regards sodium, at least partial substitution of $Na_2CO_3$ with $Na_2O$—$(SiO_2)x$. The silicates of the invention can therefore be employed for feeding a glass furnace.

It may be necessary for the silicate formed according to the invention to be made to undergo a granulation-type treatment step before it is introduced into the glass furnace. The glass furnace may be of conventional design (for example, an electric melting furnace using submerged electrodes, a crown-fired furnace operating with lateral regenerators, a horseshoe-fired furnace and any type of furnace known in the glass industry thus including submerged-burner furnaces), possibly with a design and an operating method that are slightly modified so as to be suitable for a melting process with no carbonate or with less carbonate than for standard melting operations.

It should be noted that certain silicates other than sodium silicate are also very useful to manufacture according to the invention. Thus, the invention allows potassium silicate to be manufactured from KCl, which is, at least economically, very advantageous as batch material containing Si and K for the manufacture of what is referred to as "mixed-alkali" glass, that is to say glass containing both Na and K. Such glass is used especially for producing tactile screens, glass for television screens and glass for plasma display panels.

Likewise, the invention allows more economical manufacture of special glasses containing additives, for which chlorides are less expensive than oxides. This is the case with rare earths such as cerium—the presence of cerium oxide giving the glasses UV-screening properties—and rare earths of this type are also found in the composition of special glasses of high elastic modulus for hard disks. The invention thus makes it possible to have a batch material containing Si and Ce, namely cerium silicate, for a moderate cost.

A second outlet for the silicates manufactured according to the invention (apart from those used as batch materials for a glass furnace), more particularly sodium silicate, is in the detergents industry, sodium silicate frequently being incorporated into the composition of washing powders/detergents.

A third outlet for the silicates (and possibly the chlorinated derivatives) formed according to the invention is in the preparation of special silicas commonly referred to as "precipitated silicas" that are incorporated for example in the composition of concretes. This is because the silicates formed according to the invention may undergo acid attack, advantageously by sulfuric acid, so as to precipitate silica in the form of particles having a particular particle size: the intended particle size is generally nanometric (1 to 100 nm of example).

To carry out reaction (1) of converting the halides to sulfates, a reactor known in the chemical industry by the name Mannheim furnace may be used.

To carry out reaction (2) of converting the sulfates to silicates, it is possible to use, as described in the patent WO-00/46161, a reactor fitted with one or more submerged burners and with at least one means of introducing the silica and/or the sulfates below the level of the molten materials, especially in the form of one or more feed-screw batch chargers. Preferably, the same applies in the case of the solid or liquid fuels possibly used, such as the carbon-based or hydrocarbon-based and/or sulfur-based compounds (including sulfur and carbon) mentioned above. It is thus possible to introduce, directly into the mass of products undergoing melting/reaction, at least those of the starting reactants that can vaporize before having the time to react.

To optimize the entire process from the energy standpoint, the heat may be recovered from the smoke output by the submerged-burner reactor used for reaction (2) and used to contribute to the heat supply needed for reaction (1) in the Mannheim-type furnace.

The process according to the invention described above therefore has many advantages, among which:

a reduction in $CO_2$ emissions in glass furnaces which completely or partly substitute sodium carbonate with sodium silicate—these furnaces consume less energy since the decarbonatization reactions are reduced or eliminated;

beneficiation of the halogen of the starting halide, especially in HCl form when it is a chloride;

the possibility of turning the process into a feedback process, with the $H_2SO_4$ byproduct manufactured being reused; and the possibility of utilizing sulfur-based derivatives as fuel.

The invention will be explained in detail below with the aid of nonlimiting examples and with the aid of FIG. 1:

FIG. 1: a diagram of a preferred method of implementing the process according to the invention, operating in feedback mode.

The two examples according to the invention both relate to the manufacture of sodium silicate from sodium chloride and sulfuric acid, according to the method of implementation illustrated in FIG. 1.

Let us now explain the details of the reaction process in terms of three major steps, each represented in the form of a feedback loop in FIG. 1: the purpose of the two examples is to manufacture 1000 kg of sodium silicate of formula Na2O—$(SiO_2)_2$, i.e. 5489 mol. It will be considered that the yields of the reactions involved are 100%.

1—Synthesis of Sodium Sulfate

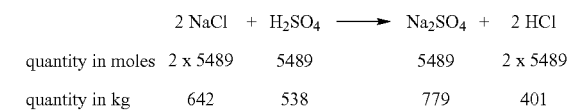

|  | 2 NaCl | + $H_2SO_4$ | → | $Na_2SO_4$ | + | 2 HCl |
|---|---|---|---|---|---|---|
| quantity in moles | 2 × 5489 | 5489 |  | 5489 |  | 2 × 5489 |
| quantity in kg | 642 | 538 |  | 779 |  | 401 |

This step is carried out in a Mannheim furnace in a known manner.

2—Synthesis of Sodium Silicate with Submerged Burner

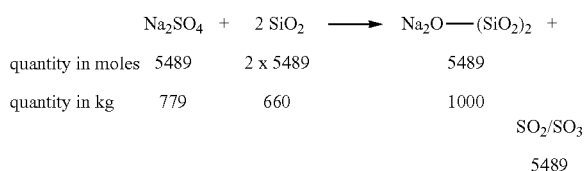

|  | $Na_2SO_4$ | + 2 $SiO_2$ | → | Na2O—$(SiO_2)_2$ | + |
|---|---|---|---|---|---|
| quantity in moles | 5489 | 2 × 5489 |  | 5489 |  |
| quantity in kg | 779 | 660 |  | 1000 |  |
|  |  |  |  |  | $SO_2/SO_3$ |
|  |  |  |  |  | 5489 |

This synthesis is carried out in a submerged-burner furnace, like that described in the patent WO-00/46161.

3—Combustion Reaction Providing the Energy Needed for Synthesizing the Silicate (Estimated here to be 2042 kWh/tonne of Silicate)

For a fuel containing carbon-based chains, of standard formula $CH_x$, and sulfur, the combustion reactions are:

$$CH_x + (1 + x/4)O_2 \longrightarrow CO_2 + x/2\, H_2O \qquad (3)$$
$$S + O_2 \longrightarrow SO_2$$

Depending on the sulfur content of the fuel, in the combustion reaction a greater or lesser amount of $SO_2$ is released into the smoke which will be added to the $SO_x$ produced by the silicate synthesis itself. The number of moles of $SO_2$ produced by the combustion is denoted "y".

4 and 4'—Conversion of the Sulfur Oxides into Sulfuric Acid

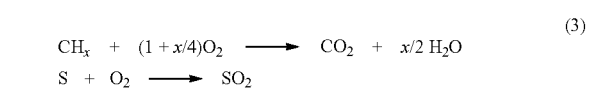

|  | $SO_2/SO_3$ | → | $H_2SO_4$ |
|---|---|---|---|
| quantity in moles | 5489 + y |  | 5489 + y |

5489 mol of $H_2SO_4$ are reintroduced into the sodium sulfate synthesis (1). The "y" moles remaining can be utilized outside this synthesis loop.

EXAMPLE 1

This example uses for step (3) fuel 100% in sulfur form (coming especially from the desulfurization of oil refinery products).

Its net calorific value (NCV) is 2584 kWh/tonne of sulfur.

Reaction (2) requires 2042 kWh, i.e. 790 kg of sulfur (24688 mol of S).

Combustion of this sulfur produces y (=24688) moles of $SO_2$.

Apart from the 5489 mol self-feeding the feedback loop with $H_2SO_4$, a further 24688 mol of $H_2SO_4$ are therefore obtained, i.e. 2420 kg that can be utilized outside the feedback loop.

EXAMPLE 2

This example uses for step (3) a fuel in the form of a No. 2 heavy fuel oil containing 4% sulfur.

Its NCV is about 10930 kWh/t. Therefore 187 kg of this fuel oil is needed to produce one tonne of silicate.

7.5 kg of sulfur coming from this fuel oil, i.e. 234 mol, will therefore be burnt, releasing y (=234) moles of $SO_2$.

234 mol, i.e. 23 kg of $H_2SO_4$ are therefore obtained that can be utilized outside the feedback loop.

It may therefore be seen that the excess sulfuric acid that can be obtained over that needed for reaction (1) varies greatly depending on the choice of fuel. All the intermediate solutions, with the combination of fuel oil and sulfur, or else the use of vulcanized tires, are possible, thereby allowing the best adjustment of the combustion (3) depending on the type of fuel most available and/or on the amount of sulfuric acid that it is desired to produce.

The invention claimed is:

1. A process for manufacturing compounds based on one or more silicates of alkali metals and/or of alkaline-earth metals and/or of rare earths, optionally in the form of mixed silicates that combine at least two of these elements, said process comprising (a) a conversion reaction (2) in which sulfates of said alkali metals and/or of said rare earths and/or of said alkaline-earth metals together with silica are converted into the corresponding silicates, the heat supply needed for this conversion being provided, at least in part, by a combustion reaction (3) using at least one submerged burner, wherein to carry out combustion reaction (3), the at least one submerged burner is fed with at least one fuel in gaseous form including sulfur-based compound and (b) a conversion reaction (1) for converting halides of said alkali metals and/or of said rare earths and/or of said alkaline-earth metals into the corresponding sulfates which then are involved in reaction (2).

2. The process as claimed in claim 1, wherein the sulfur oxides obtained by reactions (2) and (3) are recovered and in that they are made to undergo a reaction to convert them into sulfuric acid.

3. The process as claimed in claim 1, wherein reaction (1) of converting the halides into sulfates is carried out with sulfuric acid, all or some of this sulfuric acid coming from reaction of converting into sulfuric acid the sulfur oxides coming from combustion reaction (2) and (3).

4. The process as claimed in claim 3, wherein reaction of converting the sulfur oxides into sulfuric acid produces more sulfuric acid than is needed for reaction (1) of converting the halides into sulfates.

5. The process as claimed in claim 1, wherein it manufactures sodium silicate by:
   1) conversion of NaCl by H2SO4 into Na2SO4, together with HCl,
   2) conversion of the Na2SO4 into (Si02)x-Na2O by silica with heat supply using submerged burners.

6. The process as claimed in claim 5, wherein the reaction (1) takes place in a Mannheim reactor.

7. The process as claimed in claim 1, wherein the heat of the smoke of the submerged-burner reactor used for reaction (2) is recovered and used to contribute to the heat supply needed for reaction (1).

8. The process as claimed in claim 7, wherein the sulfur oxides obtained in the smoke are recovered and converted into sulfuric acid.

9. The process as claimed in claim 8, wherein the sulfuric acid recovered is used in reaction (1).

10. A process for manufacturing compounds based on one or more silicates of alkali metals and/or of alkaline-earth metals and/or of rare earths, optionally in the form of mixed silicates that combine at least two of these elements, said process comprising (a) a conversion reaction (2) in which sulfates of said alkali metals and/or of said rare earths and/or of said alkaline-earth metals together with silica are converted into the corresponding silicates, the heat supply needed for this conversion being provided, at least in part, by a combustion reaction (3) using at least one submerged burner, wherein a fuel in liquid form comprising a sulfur-based compound is provided to carry out combustion reaction (3) and (b) a conversion reaction (1) for converting halides of said alkali metals and/or of said rare earths and/or of said alkaline-earth metals into the corresponding sulfates which then are involved in reaction (2).

11. The process as claimed in claim 10, wherein the fuel is brought close to said submerged burner(s).

12. The process as claimed in claim 10, wherein the sulfur oxides obtained by reactions (2) and (3) are recovered and in that they are made to undergo a reaction to convert them into sulfuric acid.

13. The process as claimed in claim 10, wherein reaction (1) of converting the halides into sulfates is carried out with sulfuric acid, at least some of this sulfuric acid coming from reaction of converting into sulfuric acid the sulfur oxides coming from combustion reaction (2) and (3).

14. The process as claimed in claim 13, wherein reaction of converting the sulfur oxides into sulfuric acid produces more sulfuric acid than is needed for reaction (1) of converting the halides into sulfates.

15. The process as claimed in claim 10, wherein it manufactures sodium silicate by:
   1) conversion of NaCl by H2SO4 into Na2SO4, together with HCl,
   2) conversion of the Na2SO4 into (SiO2)x-Na2O by silica with heat supply using submerged burners.

16. The process as claimed in claim 15, wherein the reaction 1) takes place in a Mannheim reactor.

17. The process as claimed in claim 10, wherein the heat of the smoke of the submerged-burner reactor used for reaction (2) is recovered and used to contribute to the heat supply needed for reaction (1).

18. The process as claimed in claim 10, wherein the sulfur oxides obtained in the smoke are recovered and converted into sulfuric acid.

19. The process as claimed in claim 18, wherein the sulfuric acid recovered is used in reaction (1).

20. The process as claimed in claim 10 wherein the fuel is based on at least one sulfur-based compound.

21. The process as claimed in claim 10 wherein the sulfur-based compound is an oil industry byproduct.

22. A process for manufacturing compounds based on one or more silicates of alkali metals and/or of alkaline-earth metals and/or of rare earths, optionally in the form of mixed silicates that combine at least two of these elements, said process comprising (a) a conversion reaction (2) in which sulfates of said alkali metals and/or of said rare earths and/or of said alkaline-earth metals together with silica are converted into the corresponding silicates, the heat supply needed for this conversion being provided, at least in part, by a combustion reaction (3) using at least one submerged burner, wherein a fuel in solid form comprising a sulfur-based compound is provided to carry out combustion reaction (3) and (b) a conversion reaction (1) for converting halides of said alkali metals and/or of said rare earths and/or of said alkaline-earth metals into the corresponding sulfates which then are involved in reaction (2).

23. The process as claimed in claim 22, wherein the fuel is brought close to said submerged burner(s).

24. The process as claimed in claim 22, wherein the sulfur oxides obtained by reactions (2) and (3) are recovered and in that they are made to undergo a reaction to convert them into sulfuric acid.

25. The process as claimed in claim 22, wherein reaction (1) of converting the halides into sulfates is carried out with sulfuric acid, at least some of this sulfuric acid coming from reaction of converting into sulfuric acid the sulfur oxides coming from combustion reaction (2) and (3).

26. The process as claimed in claim 25, wherein reaction of converting the sulfur oxides into sulfuric acid produces more sulfuric acid than is needed for reaction (1) of converting the halides into sulfates.

27. The process as claimed in claim 22, wherein it manufactures sodium silicate by:
   1) conversion of NaCl by H2SO4 into Na2SO4, together with HCl,
   2) conversion of the Na2SO4 into (SiO2)x-Na2O by silica with heat supply using submerged burners.

28. The process as claimed in claim 27, wherein the reaction (1) takes place in a Mannheim reactor.

29. The process as claimed in claim 22, wherein the heat of the smoke of the submerged-burner reactor used for reaction (2) is recovered and used to contribute to the heat supply needed for reaction (1).

30. The process as claimed in claim 22, wherein the sulfur oxides obtained in the smoke are recovered and converted into sulfuric acid.

31. The process as claimed in claim 30, wherein the sulfuric acid recovered is used in reaction (1).

32. The process as claimed in claim 22 wherein the fuel is based on at least one sulfur-based compound.

33. The process as claimed in claim 22 wherein the sulfur-based compound is solid sulfur.

34. A process for manufacturing compounds based on one or more silicates of alkali metals and/or of alkaline-earth metals and/or of rare earths, optionally in the form of mixed silicates that combine at least two of these elements, said process involving a conversion reaction (1) for converting halides of said alkali metals and/or of said rare earths and/or of said alkaline-earth metals into sulfates, and a conversion reaction (2) in which the sulfates of said alkali metals and/or of said rare earths and/or of said alkaline-earth metals together with silica are converted into the corresponding silicates, the heat supply needed for at least conversion reaction (2) being provided, at least in part, by a combustion reaction (3) using at least one submerged burner.

\* \* \* \* \*